United States Patent [19]

Schmidt

[11] 4,450,647
[45] May 29, 1984

[54] BAIT HOLDER FOR LEECHES

[76] Inventor: Earl A. Schmidt, 14506 County Rd. 6, Plymouth, Minn. 55441

[21] Appl. No.: 396,410

[22] Filed: Jul. 8, 1982

[51] Int. Cl.³ .............................................. A01K 97/04
[52] U.S. Cl. ........................................ 43/55; 220/410
[58] Field of Search ........................... 43/54.1, 55, 56; 220/409, 410

[56] References Cited

U.S. PATENT DOCUMENTS

| | | | |
|---|---|---|---|
| 1,165,952 | 12/1915 | Dunlap | 43/54.1 |
| 2,077,218 | 4/1937 | Conner | 43/55 |
| 2,272,561 | 2/1942 | Hubbell | 43/56 |
| 3,468,289 | 9/1969 | Broida | 43/55 |

FOREIGN PATENT DOCUMENTS 607287  10/1960  Canada .................................. 43/56

Primary Examiner—Nicholas P. Godici
Assistant Examiner—Marc Hodak
Attorney, Agent, or Firm—Hugh D. Jaeger

[57] ABSTRACT

A leech keeper including: a hollow wall container with threads positioned on the top exterior; a nested strainer including holes in the sides and bottom with a weight string hole affixed to the bottom and a lip at the top with interior threads; and a lid including a hollow portion for flotation, interior threads for screwing onto the container holding the strainer, and exterior threads for engaging with the interior threads of the strainer. The double-lined construction of the container keeps the water cool for extended periods of time and provides a watertight container for storage and flotation of the leeches. This provides an environment for the leeches to remain healthy and to live longer, ensuring better fishing.

4 Claims, 2 Drawing Figures

4,450,647

BAIT HOLDER FOR LEECHES

BACKGROUND OF THE INVENTION

1. Field of the Invention

The present invention pertains to an aid for fishermen and, more particularly, pertains to a leech keeper for storing leeches any amount of time, either under refrigeration or in the water.

2. Description of the Prior Art

The prior art bait buckets have usually only been devoted to the caring and keeping of minnows or the like small aquatic members of the fish family. The prior art bait buckets have not been so concerned with keeping of leeches or other specialty type of bait.

The problem with the prior art bait buckets is that the buckets were devoted to keeping lots of air supplied to minnows or the like providing for extensive and complex assemblage of components for minnows or the like. This resulted in an expensive bait bucket as well as an impractical device for keeping of leeches.

The prior art bait buckets were not watertight containers for storage, traveling and fishing by backpackers nor were the prior art bait buckets capable of providing fresh water for the storing of the bait over indefinite periods of time.

The present invention overcomes the disadvantages of the prior art by providing a leech keeper which cannot only convert into a watertight container, but is also a freshwater container.

SUMMARY OF THE INVENTION

The general purpose of the present invention is to provide a leech keeper which is a watertight container for storage, traveling and fishing, but also converts into a freshwater container for live storage or leeches in the water. The leech keeper includes three components, a container, strainer, and top which all interfit with respect to each other providing for a compact leech keeper.

According to one preferred embodiment of the present invention, there is provided a leech keeper including a double-lined construction container including a hollow wall for insulating, threads positioned on the exterior top of the container for accepting interior threads of a top; a strainer including a round side and bottom, a plurality of ⅛" holes punched at eighty holes per square inch in side and bottom, a stiring tab secured to the bottom of the strainer, a lip secured about the top of the strainer for resting on the top of the container and interior threads for accepting a threaded top; and a top including a hollow portion for flotation, a stiring tab secured to an inner portion of the top, a plurality of inner threads for engaging with the outer threads of the strainer, and a plurality of outer threads at a smaller diameter for engaging with the inner threads of the strainer whereby the strainer meets between the top and container in providing a watertight closed container for the leeches, or in the alternative the top engages into the strainer and can be weighted down by the string tab on the strainer and appropriately tied by the string tab on the top for floating in water, thus keeping the leeches alive over an indefinite time.

One significant aspect and feature of the present invention is a leech keeper for storing leeches over any amount of time as practical. The leech keeper stores the live bait under refrigeration for a long period of time, or in the alternative in the lake while one is fishing.

Another significant aspect and feature of the present invention is a leech keeper which includes three components parts—a top, a strainer, and an insulated container. The top is constructed to act as a watertight cover and aids in the flotation of the keeper. The strainer is a sieve-like cannister with a plurality of ⅛" or the like holes covering the sides and entire bottom. The holes allow water to flow freely through the container while in the lake. The double lined construction of the container keeps the water cool for long periods of time and also provides a watertight container for storage or transportation of the leeches.

Another significant aspect and feature of the present invention is a leech keeper including a string tab so that strings can be tied to float the leech keeper in water as well as weighting the leech keeper at the same time.

Having thus described the present invention, it is the principal object hereof to provide a leech keeper for the storage and transportation of leeches.

One object of the present invention is that the leech keeper provides the leeches with a longer, healthier life, ensuring better fishing.

Another object of the present invention is a leech keeper which will keep leeches without a lot of fuss and muss. This aids the fisherman in properly caring for the leeches.

BRIEF DESCRIPTION OF THE DRAWINGS

Other objects and many of the attendant advantages of this invention will be readily appreciated as the same becomes better understood by reference to the following detailed description which considered in connection with the accompanying drawings, in which like reference numerals designate like parts throughout the figures thereof and wherein.

DESCRIPTION OF THE PREFERRED EMBODIMENTS

Figure 1:
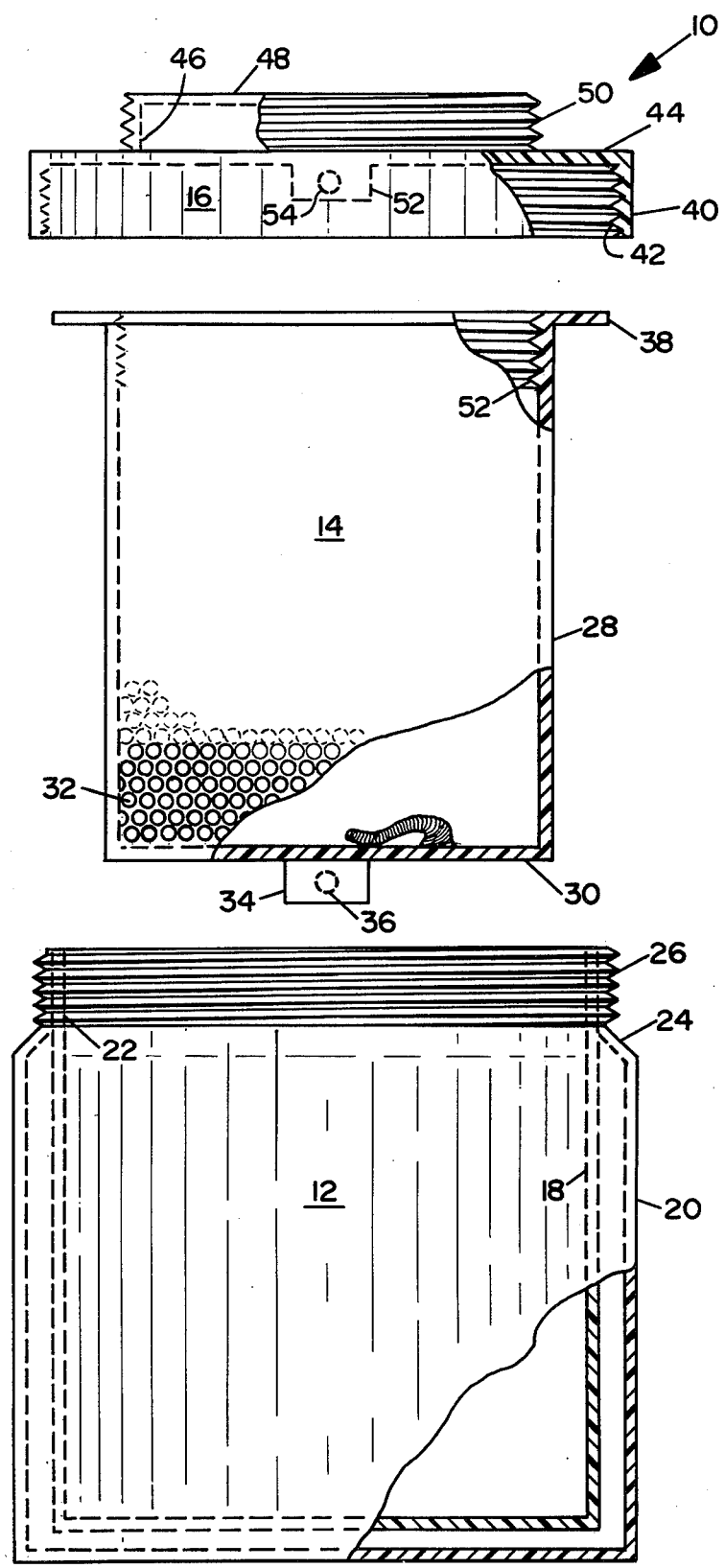
FIG. 1 illustrates a separated view of components of the leech keeper, the present invention; and, FIG. 2 illustrates the leech keeper with the components assembled.

FIG. 1 illustrates a plan view of the separated components of the leech keeper 10, the present invention, including a container 12, a strainer 14, and a top 16.

The container 12 includes a first inner wall 18 and a preformed outer wall 20 secured about the upper circumference at point 22 to form a vertical lip. The outer wall 20 has a slight angle 24 providing for separation between the inner wall 18 and the outer wall 20. A number of threads 26 are provided about the lip 22 on an outer surface as later described in detail. Container 12 can be manufactured from hard plastic or the like material and in sizes dependent upon the consideration of the number of leeches to be stored.

The strainer 14 includes a round side 28 and bottom 30 with a plurality of ⅛" or the like holes 32 at approximately 60–120 per square inch punched in the sides and bottom. A strainer tab 34 secures onto the bottom and includes a hole 36 for tying of a string or the like. A ring flange 38 surrounds the top of the side 28 providing a lip for support on the top of the container, as well as a grasping surface. The strainer 14 can be made of hard plastic or the like material.

The top 16 includes a cylinder 40 having internal threads 42 which engage with the threads 26 of the container 12, a cylindrical top member 44, and a smaller cylinder 46 including a top member 48 where a hollow space for flotation 56 is provided between numbers 44, 46 and 48. Outer threads 50 are provided about the cylinder 46 for engaging with the strainer threads 52 of the strainer 14. A string tab 52 secures onto the bottom of the member 44 and includes a string hole 54.

Figure 2:
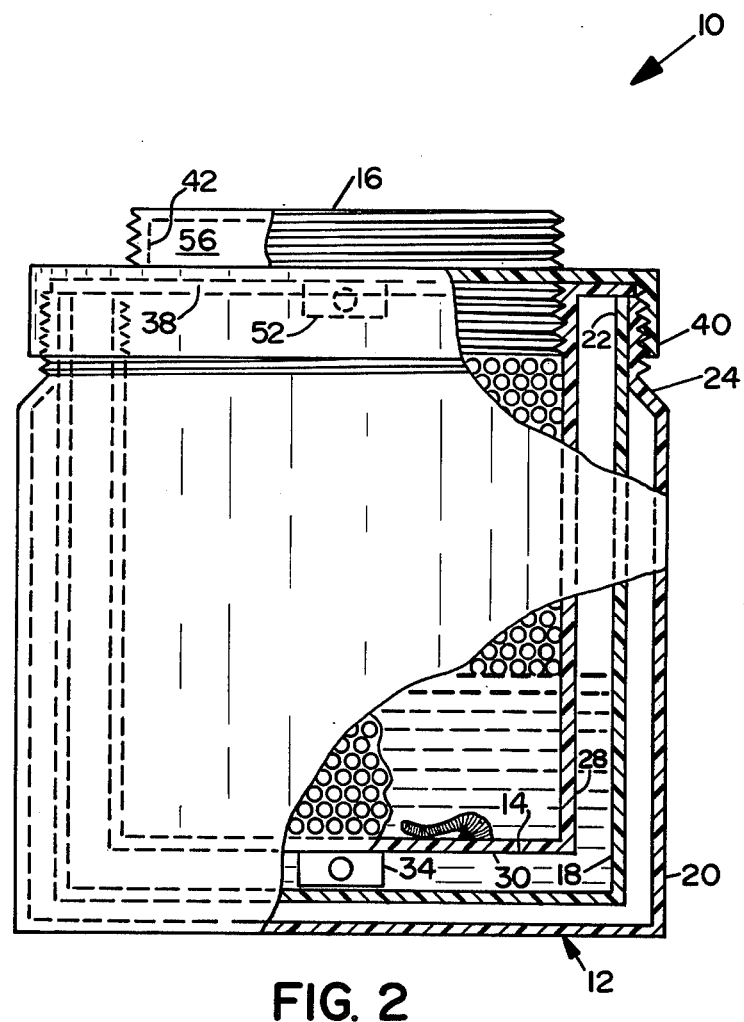

The leech keeper 10 is best described in mode of operation of FIG. 2 showing the assemblage of the container 12, the strainer 14, and the top 16 where the strainer 14 is secured between the top 16 and the container 12 by engaging with the threads 42 and 26. Accordingly, watertight container is provided where the leeches are kept cool through the double-wall insulation between walls 18 and 20. In the event the leech keeper would fall overboard or be dropped into the water, the hollow walls of the container 12 as well as the top 16 would keep the leech keeper afloat. In the event that leeches would require fresh water or the strainer were to be permanently left in the water for some time, the top would engage into the strainer by the meshing of threads 46 and 52. A weighted string could be tied through hole 36 of string tab 34 and a securing string could be tied through hole 54 of string tab 52.

Various modifications can be made to the present invention without departing from the apparent scope thereof. Foam material or the like can be provided between walls 18 and 20. A separate handle can be provided on the top 16. The number of holes can vary in the strainer 14. The type of material for construction can be other than plastic such as metal or the like, or a combination thereof.

Having thus described the invention, what is claimed is:

1. In combination, a leech keeper including:
   a. a container including an inner wall closed cylinder, an outer wall closed cylinder, the inner wall closed cylinder being of smaller diameter and height than the outer wall closed cylinder, the top of the inner wall closed cylinder and the outer wall closed cylinder secured at a lip slightly above an angulared portion slightly below a top portion of said outer wall closed cylinder, and a plurality of outer threads over an upper distance of said lip common to said top of said inner wall and outer wall of said closed cylinder;
   b. a strainer including a round cylindrical member and a bottom attached thereto, a plurality of holes punched in said cylindrical member and bottom, a string tab secured to an underside of said bottom, a lip secured about a top edge of said cylindrical member, and interior threads adjacent a top edge of said cylindrical member, and;
   c. a top including a hollow portion for flotation, a string tab secured to an inner portion of said top, a plurality of inner threads for engaging said outer threads of said container, and a plurality of outer threads for engaging interior threads of said strainer said top including stepped portions of larger and smaller cylindrical members for supporting said string tab, said inner threads, said outer threads, and said flotation portion respectively whereby said strainer meets between said top and said container providing a watertight closed container for leeches, and whereby said top engages into said strainer and can be secured by said string tabs for floating said leeches in water thereby keeping the leeches alive.

2. Combination of claim 1 wherein said holes in said strainer are 60–120 per square inch of surface.

3. Combination of claim 1 wherein said holes in said strainer are 80 holes per square inch of surface.

4. Combination of claim 1 wherein said container, said strainer, and said top are made of plastic.

* * * * *